United States Patent
Krauss et al.

(10) Patent No.: US 10,884,255 B2
(45) Date of Patent: Jan. 5, 2021

(54) LINEAR POLARIZATION OF A LASER BEAM

(71) Applicant: TRUMPF Lasersystems for Semiconductor Manufacturing GmbH, Ditzingen (DE)

(72) Inventors: Guenther Krauss, Ditzingen (DE); Andrea Hartung, Stuttgart (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 280 days.

(21) Appl. No.: 15/951,409

(22) Filed: Apr. 12, 2018

(65) Prior Publication Data
US 2018/0231790 A1    Aug. 16, 2018

Related U.S. Application Data

(63) Continuation of application No. PCT/EP2015/073767, filed on Oct. 14, 2015.

(51) Int. Cl.
*G02B 27/28* (2006.01)
*G02B 27/09* (2006.01)
*G02B 5/30* (2006.01)

(52) U.S. Cl.
CPC ....... *G02B 27/283* (2013.01); *G02B 27/0955* (2013.01); *G02B 27/0977* (2013.01);
(Continued)

(58) Field of Classification Search
CPC ............... G02B 27/283; G02B 27/286; G02B 27/0955; G02B 27/0977; G02B 27/288; G02B 27/3066
See application file for complete search history.

(56) References Cited

U.S. PATENT DOCUMENTS 6,459,071 B2   10/2002   Schluter
7,180,666 B2    2/2007   Benoit et al.
(Continued)

FOREIGN PATENT DOCUMENTS

CN   1300626 C    2/2007
DE   100 33 071   1/2002
(Continued)

OTHER PUBLICATIONS

Thin-Film Polarizers: C02 Laser Optics, II-VI Deutschland, 2015, http://www.ii-vi.de/ english/C02-Laser-Optics/thin-fi lm-polarizers. html, 2 pages.
(Continued)

*Primary Examiner* — Robert E. Tallman
(74) *Attorney, Agent, or Firm* — Fish & Richardson P.C.

(57) ABSTRACT

Methods, devices and systems for linear polarization of a laser beam are provided. In one aspect, a polarization system includes: a first polarizer having a first polarizer surface for linear polarization of a laser beam propagating in a first direction and striking the first polarizer surface at a first angle, a phase shifter configured to rotate a polarization direction of the linearly polarized laser beam transmitted at the first polarizer surface by a predetermined rotation angle, and a second polarizer having a second polarizer surface, the linearly polarized laser beam striking the second polarizer surface at a second angle after having passed through the phase shifter and being transmitted by the second polarizer surface. An incidence plane of the laser beam striking the second polarizer surface is rotated by the predetermined rotation angle relative to an incidence plane of the laser beam striking the first polarizer surface.

3 Claims, 2 Drawing Sheets

(52) U.S. Cl.
CPC ......... *G02B 27/286* (2013.01); *G02B 27/288* (2013.01); *G02B 5/3066* (2013.01)

(56) References Cited

U.S. PATENT DOCUMENTS

| | | | |
|---|---|---|---|
| 2008/0002751 A1* | 1/2008 | Hua | H01S 3/115 372/55 |
| 2012/0092746 A1 | 4/2012 | Hou et al. | |
| 2014/0346374 A1* | 11/2014 | Yanagida | H01S 3/0064 250/504 R |
| 2014/0346376 A1* | 11/2014 | Nowak | H01S 3/2316 250/504 R |
| 2015/0062544 A1 | 3/2015 | Ershov | |

FOREIGN PATENT DOCUMENTS

| | | |
|---|---|---|
| DE | 10 2007 033 567 | 4/2009 |
| DE | 10 2011 054 941 | 1/2013 |
| EP | 0 518 111 | 12/1992 |
| EP | 1 742 307 | 1/2007 |
| JP | S61238487 | 10/1986 |
| JP | H11068213 | 3/1999 |
| WO | WO 2011/122397 A1 | 10/2011 |

OTHER PUBLICATIONS

International Search Report and Written Opinion in International Application No. PCT/EP2015/073767, dated Jun. 9, 2016, 20 pages (with English translation).
International Report on Patentability in International Application No. PCT/EP2015/073767, dated Apr. 26, 2018, 17 pages (with English translation).
TW Office Action in Taiwanese Appln. No. 105132932, dated Aug. 4, 2020, 10 pages (with English translation).

* cited by examiner

LINEAR POLARIZATION OF A LASER BEAM

CROSS REFERENCE TO RELATED APPLICATIONS

This application is a continuation of and claims priority under 35 U.S.C. § 120 from PCT Application No. PCT/EP2015/073767 filed on Oct. 14, 2015, the entire contents of which is incorporated herein by reference in its entirety.

TECHNICAL FIELD

The present invention relates to linear polarization of a laser beam.

BACKGROUND

A transmissive polarizer arrangement typically includes a polarizer surface, which is oriented at an angle with respect to an incident beam, for example a laser beam. The polarization surface may for example be formed on one side of a carrier element made of a material which is transmissive for the laser beam, for example on one side of a plane-parallel plate. The (for example unpolarized) laser beam in this case strikes the polarizer surface of the transmissive carrier element at an angle not equal to 90°, typically at the so-called Brewster angle. A radiation component possibly reflected by the polarizer surface is in this case essentially polarized perpendicularly to the incidence plane of the laser beam on the polarizer surface (s-polarization). A radiation component transmitted by the polarizer surface typically has a high proportion of a second polarization direction, which extends parallel to the incidence plane of the incident laser beam (p-polarization).

A polarization-selective coating, which increases the reflectivity of the polarizer surface for the s-polarized radiation component of the laser beam, or reinforces the separation of the mutually perpendicularly polarized radiation components, may be formed on the polarizer surface. Such polarizer devices are also referred to as thin-film polarizers (TFP). Thin-film polarizers are available, for example, from the company II-VI, cf. "www.ii-vi.de/english/CO2-Laser-Optics/thin-film-polarizers.com". As an alternative or in addition to a polarization-selective coating, a polarizer device may include not only one but a plurality of plane-parallel plates, the side surfaces of which respectively form a polarizer surface, these being oriented parallel to one another and at the Brewster angle to the incident beam, in order to further reduce the relatively small s-polarized radiation component of the light beam transmitted by a respective polarizer surface, or a respective plane-parallel plate.

Such polarizers may also be used in high-power applications, in which the laser beam has a power of several hundred watts, as is the case for example in laser processing machines for processing, for example cutting or welding, workpieces, or in EUV radiation generating apparatuses in which a high-power laser beam is directed onto a target material in order to convert the latter into a plasma state and thereby generate EUV radiation.

High laser powers have the effect that a temperature-dependent change of the refractive index takes place in the material transmitting the (polarized) laser beam, and this change results in a so-called thermal lens. Since the power of the laser beam, and therefore the temperature of the transmitting material, is greater at the center of the beam profile of the laser beam than in the edge region of the laser beam, the optical thickness of the material varies like in a lens from the center of the beam profile of the laser beam to its edge region.

Various approaches are known for compensating for such a thermal lens: for example, it is known from DE 10 2011 054 941 B3 to carry out a correction of the thermal shift of the focal position of a laser beam of a high-power laser with the aid of a correction unit which includes at least one variable optical element for varying the focal position with the aid of correction data.

From JP 61238487, it is known to monitor the thermal lens on a semitransparent mirror of a laser resonator by orienting a laser beam onto the semitransparent mirror at an angle with respect to the beam path of the laser radiation generated in the laser resonator and measuring the laser beam deviation generated by the thermal lens.

JP 11068213 has disclosed a CO2 laser having a Q-switch, in which the thermal lens effect of an optical element arranged in the beam path is intended to be compensated for, inter alia by using a rotating chopper.

US 2015/0062544 A1 has disclosed an apparatus for temperature compensation of a focusing system, which includes at least one transmissive optical element having a thermal lens. For the temperature compensation, at least one reflective optical element is used, which likewise has a thermal lens, which is complementary to the thermal lens of the transmissive optical element so that the combined optical properties of the two optical elements are essentially temperature-independent.

It is likewise known to carry out conversion of linearly polarized laser radiation into circularly or elliptically polarized laser radiation for material processing. For example, DE 100 33 071 A1 describes a laser arrangement for material processing, which to this end includes at least one retardation plate. EP 1 742 307 B1 describes an apparatus in which a phase shift mirror is used for this purpose. From DE 10 2007 033 567 A1, it is known to use a laser resonator having a phase shift device in order to excite or stabilize radially or azimuthally polarized laser radiation inside the laser resonator.

SUMMARY

Implementations of the present invention provide a polarizer arrangement, an EUV radiation generating apparatus including such a polarizer arrangement, and a method for linear polarization of a laser beam, in which a rotationally non-symmetrical modification of a beam profile of the laser beam, induced by a thermal lens effect, is essentially compensated for.

One aspect of the invention features a polarizer system including: a phase shift device (or a phase shifter) for rotating a polarization direction of a linearly polarized laser beam transmitted at a first polarizer surface of a first polarizer device by a predetermined rotation angle and a second polarizer device having a second polarizer surface, which the laser beam strikes at a second angle (not equal to 0°) after having passed through the phase shift device and is transmitted by the second polarizer surface, an incidence plane of the laser beam striking the second polarizer surface being rotated by the predetermined angle relative to an incidence plane of the laser beam striking the first polarizer surface.

To generate the laser beam which enters the polarizer arrangement, a beam source is used, for example a $CO_2$ laser. The first polarizer surface and the second polarizer surface are typically formed respectively on a front side of a carrier element, which is made of a material (carrier material) that transmits the wavelength of the laser beam. If the laser beam is a $CO_2$ laser beam having a wavelength of about 10.6 μm, the transmissive material may for example be zinc selenide. The linearly polarized laser beam transmitted by the polarizer surface, or by the carrier element, may optionally also have small radiation components with a second polarization direction perpendicular to the first; such a laser beam is also referred to as a linearly polarized laser beam in the scope of this application. The type of transmissive carrier material is adapted to the wavelength of the laser beam used. For shorter wavelengths in the near IR wavelength range or in the visible wavelength range, quartz glass may for example be used as a material for the carrier element.

The laser beam striking the first polarizer surface may already be linearly polarized, specifically in such a way that it is not attenuated, or is attenuated only slightly, when it passes through the first polarizer device and through the second polarizer device. Typically, such a laser beam is p-polarized with respect to the plane of incidence onto the first polarizer surface, and correspondingly p-polarized with respect to the plane of incidence onto the second polarizer surface. The passage of an already linearly polarized laser beam through the polarizer arrangement, which preserves its linear polarization in the polarizer arrangement, may be useful when this laser beam is reflected back at one or more objects (for example a target material, see above) which are arranged downstream of the polarizer arrangement, and the polarization direction of the laser beam is rotated by at least one further phase shift device (or phase shifter), so that the polarization direction of the back-reflected laser beam striking the polarizer arrangement again is oriented perpendicularly to the polarization direction of the laser beam propagating in the forward direction. The further phase shift device may for example be a phase-shifting mirror, which respectively generates a path difference of $\lambda/4$ when the laser beam passes through in the forward direction and when the laser beam passes through in the backward direction, so that a path difference of $\lambda/2$ is produced overall. Because of the rotation of the polarization direction, the back-reflected laser beam is deviated, or reflected, by the polarization arrangement, so that it can no longer travel back to the beam source and the polarizer arrangement acts as an optical isolator.

The laser beam to be polarized can have a rotationally symmetrical, for example circular beam profile, during incidence at an angle (not equal to 0°) on the first polarizer surface strikes the latter in an elliptical surface region. The thermal lens of the transmissive material, on which the first polarizer surface is formed, therefore acts not only as a spherical lens but also additionally has the effect of a cylindrical lens: the effect of the thermal lens is greater in a first direction, which extends along the major axis of the elliptical surface region, than in a second direction, perpendicular to the first, which extends along the minor axis of the elliptical surface region. In addition, the thermal cylindrical lens also acts as a lens tilted with respect to the laser beam, which leads to an astigmatism. Because of the thermal lens effect, the linearly polarized laser beam which has passed through the beam splitter surface and the transmissive material likewise has a rotationally nonsymmetrical elliptical beam profile, which is typically more difficult to handle than a rotationally symmetrical, for example circular beam profile.

To symmetrize the beam profile, or to compensate for the thermal cylindrical lens effect, including the effect of the tilted lens, so that a linearly polarized laser beam having a rotationally symmetrical, in particular circular beam profile, is obtained, a compensating optical element, for example in the form of a cylindrical lens and/or a cylindrical mirror having a fixed focal length, could optionally be used. The strength of the thermal cylindrical lens, or more precisely the focal length of the thermal cylindrical lens, which is generated by the first polarizer device is, however, dependent on the incident laser power, so that a compensating optical element which has a constant focal length cannot compensate for the thermal cylindrical lens independently of power.

To compensate for the thermal cylindrical lens of the first polarizer device, it is therefore proposed to use a second polarizer device, which essentially acts perpendicularly to the thermal cylindrical lens of the first polarizer device. The two cylindrical lenses are superimposed, so that a spherical, or rotationally symmetrical, thermal lens is generated overall by the two polarizer devices. The spherical lens, or the spherical component of the thermal lens, of the polarizer arrangement leads to an imaging aberration in the form of an astigmatism, which essentially corresponds to the distance between the two polarizer directions, although the beam profile of the linearly polarized laser beam transmitted at the second polarizer surface remains (approximately) rotationally symmetrical, or circular.

To be able to use the second polarizer device to compensate for the thermal cylindrical lens effect of the first polarizer device, the polarization direction of the linearly polarized laser beam transmitted at the first polarizer surface can be rotated, in such a way that a significant component of the linearly polarized laser beam is transmitted by the second polarization device, without the beam profile of the linearly polarized laser beam likewise being rotated. To generate such rotation of the polarization direction without simultaneous rotation of the beam profile, a phase shift device (or a phase shifter) is used. If, on the other hand, both the polarization direction and the beam profile of the linearly polarized laser beam would be rotated, for example by a periscope, the thermal cylindrical lens effect of the first polarizer device would be further enhanced by the second polarizer device.

In one embodiment, the predetermined rotation angle of the phase shift device is between 80° and 100°, preferably 90°. Ideally, the rotation angle which is generated by the phase shift device should be 90°. This can be achieved when the phase shift device generates a phase shift of 180°, or a path difference of $\lambda/2$, $\lambda$, denoting the wavelength of the laser beam. In the case of a phase shift of 180°, or a path difference of $\lambda/2$, the laser beam remains linearly polarized. In the event of a slight deviation from a phase shift of $\lambda/2$, the linearly polarized laser beam typically becomes elliptically polarized, but is converted again into an (essentially) linearly polarized laser beam by the second polarizer device following in the beam path.

If a rotation angle of 90° is used, the incidence plane of the laser beam striking the first polarizer surface is oriented perpendicularly to the incidence plane of the laser beam striking the second polarizer surface. As described above, in this case the two thermal cylindrical lenses, including the effect of the tilted lens, act in two mutually opposite directions so that an incident laser beam having a rotationally symmetrical, in particular circular beam profile leaves the polarizer arrangement with an (essentially) rotationally symmetrical, in particular circular beam profile. The divergence of the laser beam when emerging from the polarizer arrangement is also equal in both directions, so that the laser beam also preserves its rotationally symmetrical beam profile even during further propagation. If the two directions in which the thermal cylindrical lenses act are not perpendicular to one another, a beam profile possibly deviating slightly from a circular shape will be generated. A rotation angle deviating slightly from 90°, which may for example lie between 80° and 100°, in general does not lead to optimal compensation, but may sometimes still be tolerable.

In one further embodiment the first angle and the second angle are of equal degree, i.e., the laser beam strikes the first polarizer surface and the second polarizer surface at the same angle (not equal to 0°). This is favorable to generate a thermal cylindrical effect which is of the same size in terms of magnitude in both polarization directions. It is, however, optionally also possible to select the two angles (slightly) differently and at the same time to deviate (slightly) from a rotational angle of 90°, the respective deviations being selected in such a way that the beam profile of the laser beam is essentially preserved overall when passing through the polarizer arrangement.

As explained above, the polarizer arrangement may be used to filter, or reflect, a laser beam propagating in a second direction, opposite the first, the polarization direction of which is oriented perpendicularly to the polarization direction of the laser beam propagating in the first direction. For reflection or filtering of the laser beam propagating in the second direction, the first polarizer surface and the second polarizer surface of the polarizer arrangement may optionally be used.

In another embodiment, the first polarizer device includes a third polarizer surface and/or the second polarizer device includes a fourth polarizer surface for linear polarization of a laser beam propagating in a second direction opposite to the first, the laser beam propagating in the second direction striking the third polarizer surface at the first angle and/or striking the fourth polarizer surface at the second angle. The first and third polarizer surfaces, and the second and fourth polarizer surfaces, may in particular be formed on two opposite sides of a carrier element of the first and second polarizer devices, respectively. In particular, the carrier element may be a plane-parallel plate. By the third or fourth polarizer surface, a laser beam propagating in the second direction, which has a polarization direction that is rotated by 90° relative to the polarization direction of the laser beam propagating in the first direction, can be reflected and therefore filtered so that the polarizer arrangement can be used as protection against back-reflections, or as an optical isolator. Ideally, the laser beam propagating in the second direction is already fully deviated, or reflected, at the fourth polarizer surface of the second polarizer device, so that it no longer strikes the third polarizer surface. If necessary, a signal component, transmitted at the fourth polarizer surface, of the laser beam propagating in the second direction may be deviated or reflected at the third polarizer surface.

In another embodiment, the first angle at which the laser beam strikes the first and/or third polarizer surface, and/or the second angle, at which the linearly polarized laser beam strikes the second and/or fourth polarizer surface corresponds to the Brewster angle.

When laser radiation strikes the polarizer surface at the Brewster angle, a radiation component having essentially a single polarization direction (s-polarization) is reflected at the polarizer surface, which enhances the effect of the polarization device.

The Brewster angle $\alpha_B$ at the polarization surface, or an interface between an optically thinner and an optically denser medium, is given by the following formula:

$$\alpha_B = \arctan(n_2/n_1),$$

where $n_2$ denotes the real part of the refractive index of the optically denser medium and $n_1$ denotes the real part of the refractive index of the optically thinner medium (typically air or vacuum with $n_1=1.00$). In the case of a polarizer device arranged in ambient air, the Brewster angle $\alpha_B$ is therefore determined by the refractive index $n_2$ of the transmissive material on which the polarizer surface is formed.

In another embodiment, the first polarizer surface is formed on a carrier element made of a transmissive material, preferably a plane-parallel plate, and/or the second polarizer surface is formed on a carrier element made of a transmissive material, preferably a plane-parallel plate. As described above, the laser beam ideally strikes the polarizer surface at the Brewster angle $\alpha_B$ of the respective transmissive material. A plate-shaped carrier element has proven favorable since, apart from the thermal lens, it has almost no effect on the laser beam. The use of a plate-shaped carrier element is furthermore favorable since the thermal lens increases with the length of the transmissive material volume through which the laser beam passes.

In one refinement, the first polarizer surface and the third polarizer surface are formed on opposite sides of the carrier element of the first polarizer device, and/or the second polarizer surface and the fourth polarizer surface are formed on opposite sides of the carrier element of the second polarizer device. In this case, it is particularly advantageous for the carrier element to be configured as a plane-parallel plate, since with such a plate the incidence angle on the first side coincides with the emergence angle on the second side. The light beam reflected back therefore strikes the second side of the plate at the same angle as that at which the laser beam propagating in the forward direction strikes the first side of the plate.

In one refinement, the carrier element of the first polarizer device has a polarization-selective coating on the first and/or third polarizer surface and/or the carrier element of the second polarizer device has a polarization-selective coating on the second and/or fourth polarizer surface. As described above, the two polarizer devices may be thin-film polarizers, in which a polarization-selective coating is applied on the carrier element. It is, however, to be understood that a polarization-selective coating may optionally also be omitted, in particular when the polarizer device includes a plurality of polarizer surfaces which are arranged parallel to one another and successively in the beam path.

In another embodiment, the first polarizer device and the second polarizer device are of identical design. In this case, in the event of a laser beam striking the first and second surfaces at the same angle, the two polarizer devices generate a thermal cylindrical lens which is of equal magnitude. Two polarizer devices are of identical design when they have a carrier element which is the same in its geometry and includes the same transmissive material and (if present) the same polarization-selective coating.

In one embodiment, the phase shift device includes at least one transmissive phase-shifting optical element, e.g., a retardation plate. As described above, the retardation plate is typically a $\lambda/2$ retardation plate, which generates a phase shift of 180° or a path difference of $\lambda/2$, and therefore rotation of the polarization direction by 90°, when the laser beam strikes the retardation plate perpendicularly.

In another embodiment, the phase shift device includes at least one reflective phase-shifting optical element, e.g., a phase-shifting mirror. Commercially available phase-shifting mirrors often generate a phase shift of 90°, or a path difference of λ/4. With such a phase shift, a linearly polarized laser beam is converted into a circularly polarized laser beam, and vice versa. Two phase-shifting mirrors following one another in the beam path, each of which causes a phase shift of 90°, or a path difference of λ/4, rotate the polarization direction of a linearly polarized laser beam by 90°. In this case, the phase-shifting device therefore can include two phase-shifting mirrors to generate the phase shift of 180°, or the path difference of λ/2. It is to be understood that the phase shift device may optionally include both transmissive and reflective phase-shifting elements.

Another aspect of the invention relates to an EUV radiation generating apparatus, including: a driver laser arrangement for generating a laser beam, a vacuum chamber, in which a target material can be arranged, a beam guiding device for guiding the laser beam from the driver laser device in a first direction onto the target material, and at least one polarizer arrangement as described above. The polarizer arrangement may be used for linear polarization of the laser beam propagating from the driver laser device in the direction of the target material (i.e., in a first direction) and for filtering or for deviating a laser beam reflected back to the driver laser arrangement from the target material or another object, for example a diaphragm, when the polarization direction of the laser beam reflected back is oriented perpendicularly to the polarization direction of the laser beam propagating in the forward direction.

In another embodiment the EUV radiation generating apparatus additionally includes at least one further phase shift device, which is arranged between the polarizer arrangement and the target material, the further phase shift device being configured to rotate a polarization direction of a laser beam reflected at the target material and striking the polarizer arrangement in a second direction opposite to the first, the polarization direction of which laser beam extends perpendicularly to the polarization direction of the laser beam propagating in the first direction. The polarization direction of the laser beam may possibly be rotated during impact or reflection on the target material, although it is possible for further polarization-rotating or phase shift devices, which generate such rotation of the polarization direction, for example a phase-shifting mirror, which generates a path difference of λ/2 during the double transit of the laser beam, to be arranged between the polarizer arrangement and the target material. If the target material or optionally further elements in the beam path of the laser beam likewise have a polarization-rotating effect, the effect of the further polarization-rotating device will be adapted in such a way that a rotation by 90° between a polarization direction of the laser beam emerging from the polariser arrangement and the laser beam entering the polariser arrangement in the backward direction is obtained overall.

In this case, the polarizer arrangement may be used as an optical isolator which prevents the laser beam reflected back from the target material from entering the driver laser device.

The driver laser arrangement of the EUV radiation generating apparatus can include one laser source, or optionally a plurality of laser sources generating one or optionally a plurality of (pulsed) laser beams or so-called seed pulses, which are amplified to laser powers of a plurality of kW, optionally 10 kW or more, in one, typically in a plurality of optical amplifiers of an amplifier arrangement. The or a polarizer arrangement may be arranged in the driver laser arrangement or in the beam guiding device, optionally to polarize the laser beam generated by the beam source and/or filter or deviate the laser beam reflected back at the target material. The polarizer arrangement may in particular be fitted in the beam path before the amplifier arrangement, since the laser power used there, although quite high, is typically not high enough to damage the polarizer devices of the polarizer arrangement.

It is to be understood that the polarizer arrangement described here may also be used in other applications, for example in material processing, for example in laser processing machines, to generate a (linearly) polarized laser beam having a symmetrical beam profile with the aid of polarizer devices operated in transmission, or in order to allow back-reflection protection. The use of polarizer devices operated in transmission has the advantage of easier adjustment over the use of polarizer devices operated in reflection. Furthermore, the use of polarizer devices operated in reflection would entail the risk that the laser beam travelling back destroys the polarizer device, since it typically has a much higher power than the laser beam propagating in the forward direction. The absorption of the carrier material for transmitted (p-polarized) laser radiation is however typically much greater than for reflected (s-polarized) laser radiation, so that the latter ought to be reflected and not transmitted at a respective polarizer surface. In the polarizer arrangement described here, the compensation for the thermal cylindrical lens of the first polarizer device by the second polarizer device is furthermore matched to the laser power, i.e., it varies during variation of the laser power according to the thermal cylindrical lens of the first polarizer device.

The invention also relates to a method for generating a linearly polarized laser beam propagating in a first direction, including: orienting a laser beam at a first angle onto a first polarizer surface of a first polarizer device for linear polarization of an incident laser beam, rotating a polarization direction of the linearly polarized laser beam transmitted at the first polarizer surface by a predetermined rotation angle by generating a path difference (or a phase shift), and orienting of the laser beam at a second angle onto a second polarizer surface of a second polarizer device, an incidence plane of the laser beam striking the second polarizer surface being rotated by the predetermined angle relative to an incidence plane of the laser beam striking the first polarizer surface. As described above, the first and second (incidence) angles can coincide, and they can correspond to the Brewster angle. The path difference can be λ/2, which corresponds to a phase shift of 180° and leads to a rotation of the polarization direction by a rotation angle of 90°.

In one refinement, the method includes: reflecting a laser beam propagating in a second direction opposite to the first, the polarization direction of which is oriented perpendicularly to the polarization direction of the linearly polarized laser beam propagating in the first direction, at a third polarizer surface of the first polarizer device and/or at a fourth polarizer surface of the second polarizer device. As described above, the laser beam reflected back may be reflected at the fourth polarizer surface and optionally at the third polarizer surface, so that it no longer propagates in the second direction.

Other advantages of the invention may be found in the description and the drawing. Likewise, the features mentioned above and those referred to below may be used independently, or several of them may be used in any desired combinations. The embodiments shown and described are not to be interpreted as an exhaustive list, but rather have an exemplary nature for description of the invention.

DETAILED DESCRIPTION

In the following description of the drawings, identical references are used for components which are the same or functionally equivalent.

Figure 1A:
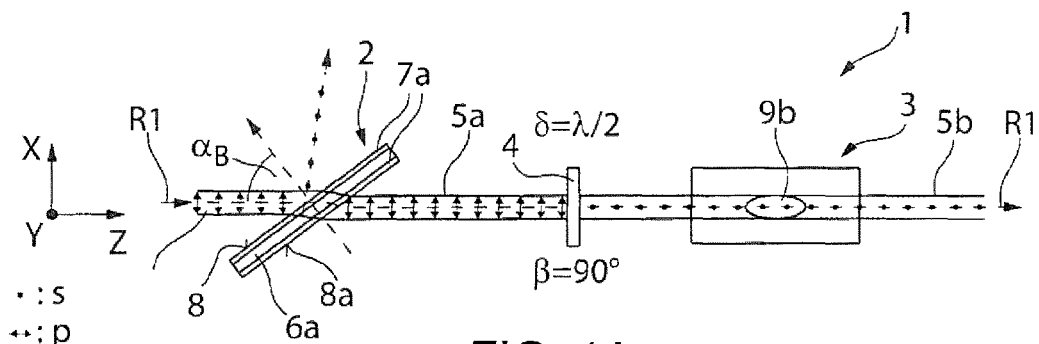
FIGS. 1A and 1B show schematic representations of a polarizer arrangement having a phase shift device in a form of a λ/2 retardation plate, through which a laser beam passes in a first direction.
Figure 1B:
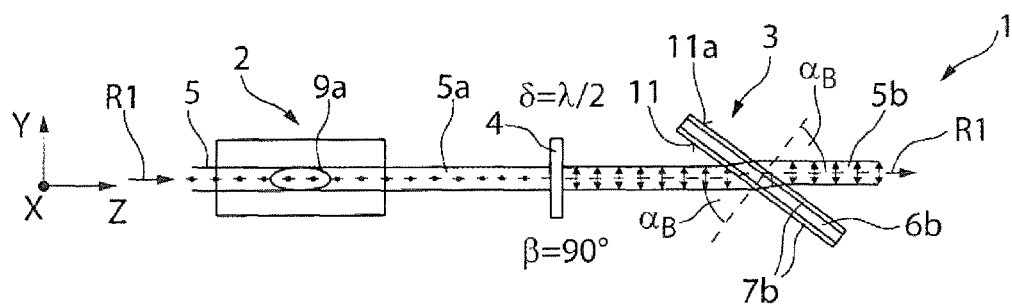

FIGS. 1A and 1B show a polarizer arrangement (or polarizer system) 1, which includes a first polarizer device 2 and a second polarizer device 3, as well as a phase shift device (or a phase shifter) 4 in the form of a λ/2 retardation plate arranged between the first polarizer device 2 and the second polarizer device 3. The phase shift device 4 generates a path difference 6 of λ/2 for a laser beam 5, which enters the polarizer arrangement 1 in a first direction R1 while being essentially p-polarized. In the example shown, the laser beam 5 has a wavelength λ 10.6 µm and is generated by a $CO_2$ laser. It is to be understood that the laser beam 5 may also have a different wavelength λ, for example a wavelength λ of about 1 µm or less.

The first polarizer device 2 and the second polarizer device 3 are of identical design, and respectively have a carrier element in the form of a plane-parallel plate 6a, 6b, on the front side of which, i.e., on the side facing toward the incident laser beam 5 propagating in a first direction R1, a polarization-selective coating 7a, 7b is applied. The material of the carrier elements 6a, 6b is zinc selenide, although it is to be understood that it is also possible to use other materials which are transparent at the wavelength λ of the laser beam 5, for example quartz glass for a wavelength λ in the visible or near IR wavelength range. The front side of the carrier element 6a of the first polarizer device 2 with the polarization-selective coating 7a forms a first polarizer surface 8 (or beam splitter surface), at which the initially unpolarized laser beam 5 is split into a laser beam 5a transmitted by the first polarizer device 2, or the first beam splitter surface 8, and a radiation component reflected by the first polarization device 2, this component only being outlined in FIG. 1A since the incident laser beam 5 is essentially p-polarized.

In the polarizer arrangement shown in FIGS. 1A and 1B, the incident laser beam 5 strikes the polarizer surface 8 at a first (incidence) angle which corresponds to the Brewster angle $\alpha_B$ of the ZnSe material of the carrier element 6a. The radiation component reflected at the first polarizer surface 8 is linearly polarized because of the arrangement of the polarizer surface 8 at the Brewster angle $\alpha_B$, and specifically essentially perpendicularly to the incidence plane X, Z of the incident laser beam 5 (s-polarization), cf. the XYZ coordinate system shown in FIGS. 1A and 1B. The laser beam 5a transmitted by the first polarizer device 2, on the other hand, is linearly polarized essentially parallel to the plane X, Z of incidence of the laser beam 5 onto the first polarizer surface 8 (p-polarization). The polarization-selective coating 7a, 7b is used to enhance the separation of the laser beam 5 into the s-polarized and p-polarized radiation components.

As can be seen with the aid of FIG. 1B, the laser beam 5 passes through the first polarizer device 8 in an elliptical surface region 9a, so that the material of the carrier element 6a of the first polarizer device 2 is heated along its thickness by the laser beam 5 in an essentially elliptical volume region. Because of the absorption of the material of the carrier element 6 or the polarization-selective coating 7a for the high power of the laser beam 5, which may for example lie in a range of several hundred W or more, a temperature gradient is generated in the irradiated volume of the carrier element 6a, and associated therewith a thermal lens, i.e., the refractive index of the material of the carrier element 6a changes as a function of the laser power.

Figure 4A:
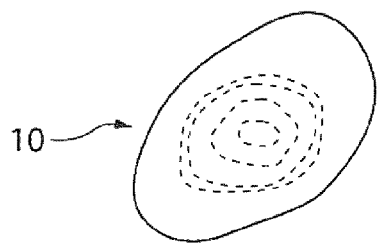
FIGS. 4A and 4B show representations of a beam profile of a linearly polarized laser beam after a first polarizer device and after a second polarizer device of the polarizer arrangement.

Since the volume through which the laser beam 5 passes is essentially elliptical, a thermal lens which acts as a spherical lens and as an additional cylindrical lens, and leads to (undesired) focusing of the laser beam 5, is generated by the first polarizer device 2. Because of the tilting of the thermal lens, the thermal cylindrical lens acts essentially in the X direction, so that the round beam profile of the incident laser beam 5 is converted into an asymmetrical beam profile 10 of the laser beam 4a transmitted by the first polarizer device 2, as is represented highly schematically in FIG. 4A.

Figure 4B:
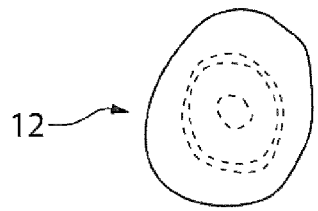

To correct the effect of the thermal cylindrical lens of the first polarizer device 2 on the transmitted linearly polarized laser beam 5a, and in this way to generate an essentially symmetrical (round) beam profile, the second polarizer device 3 is provided in the polarizer arrangement 1. The second polarizer device 3 is rotated relative to the first polarizer device 2 by a rotation angle β of 90° about the Z axis, as can be seen by comparing FIG. 1A and FIG. 1B. The laser beam 5a transmitted by the first polarizer device 2 therefore strikes a second polarizer surface 11 of the second polarizer device 3 in an incidence plane Y, Z which is rotated by the rotation angle β of 90° relative to the incidence plane X, Z in which the laser beam 5 strikes the first polarizer surface 8 of the first polarizer device 2. An elliptical surface region 9b, at which the laser beam 5a strikes the second polarizer surface 11, is therefore likewise rotated by 90°. The thermal cylindrical lens of the second polarizer device 3 therefore acts perpendicularly to the thermal cylindrical lens of the first polarizer device 2, so that the laser beam 5b transmitted by the second polarizer device 3 propagates with an essentially rotationally symmetrical cross section or beam profile 12, as is shown highly schematically in FIG. 4B.

So that the essentially linearly polarized laser beam 5a transmitted by the first polarizer device 2 is transmitted by the second polarizer device 3 arranged at the rotation angle β of 90°, it is necessary to rotate the polarization direction p of the transmitted laser beam 5a likewise by the rotation angle β, but without the beam profile 10 of the laser beam 5a likewise being rotated in this case. To this end, in the example shown in FIGS. 1A and 1B, the λ/2 retardation plate 4 is used, which rotates the polarization direction p relative to the incidence plane X, Z of the first polarizer device 2 by 90° so that the laser beam 5a transmitted by the first polarizer device 2 is s-polarized after passing through the λ/2 retardation plate 4. Since the plane Y, Z of incidence of the transmitted laser beam 5a onto the second polarizer surface 11 of the second polarizer device 3 is rotated with respect to the incidence plane X, Z of the first polarizer device 2 by 90°, the transmitted laser beam 5a is p-polarized with respect to the plane Y, Z of incidence onto the second polarizer surface 11, so that the power of the laser beam 5b is preserved, or only slightly reduced, when passing through the second polarizer device 3.

Figure 2A:
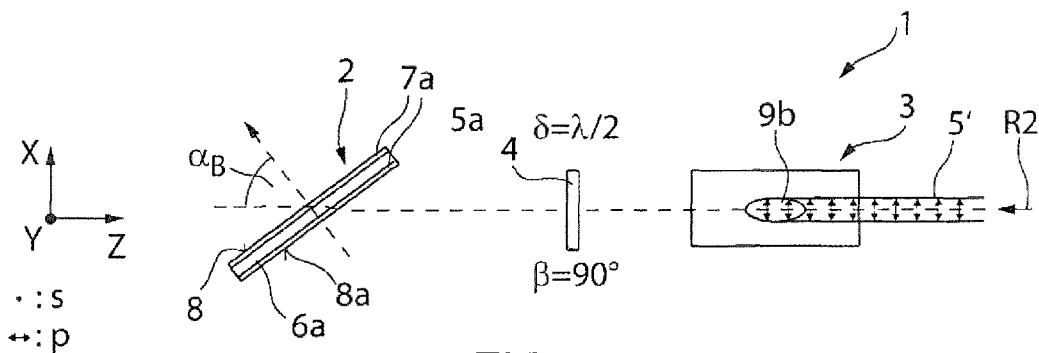
FIGS. 2A and 2B show schematic representations of the polarizer arrangement of FIGS. 1A and 1B, at which a laser beam propagating in the opposite direction is reflected, or deviated.
Figure 2B:
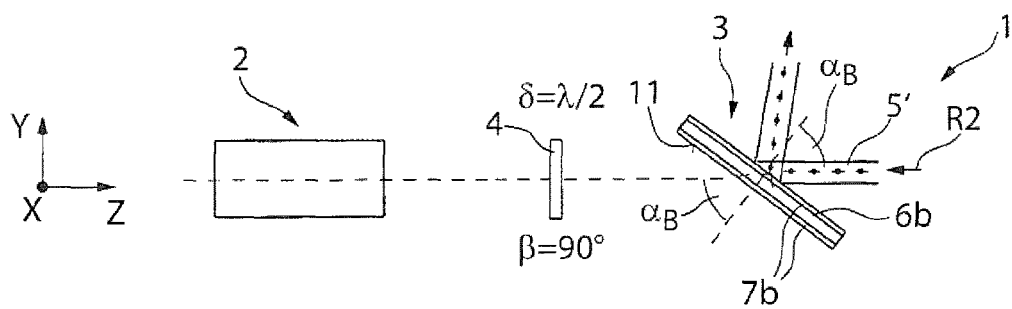

The polarizer arrangement 1 shown in FIGS. 1A and 1B may also be used to filter a laser beam 5' propagating in a second direction R2 opposite to the first, as is represented in FIGS. 1A and 2B. The laser beam 5' propagating in the second direction R2 may, in particular, be a back-reflected radiation component of the laser beam 5 propagating in the first direction R1. The laser beam 5' propagating in the second direction R2 is s-polarized with respect to the plane X, Z of incidence onto the second polarizer device 3 and strikes a fourth polarizer surface 11a, formed on the rear side of the plate-shaped carrier element 6b, at the Brewster angle $α_B$. A polarization-selective coating 7b is likewise applied on the rear side of the plate-shaped carrier element 6b of the second polariser device 3, to increase the selectivity with respect to the s-polarized and p-polarized radiation components. As can be seen in FIG. 2B, the laser beam 5' propagating in the second direction R2 is reflected at the fourth polarizer surface 11a of the second polarizer device 3 so that it no longer strikes the first polarizer device 2. The laser beam 5' reflected at the fourth polarizer surface 11a is deviated into a beam trap (not shown) and absorbed thereby.

Since the laser beam 5' reflected back is possibly not reflected fully at the fourth polarizer surface 11a, the rear side of the carrier element 6a of the first polarizer device 2 may be used as a third polarizer surface 8a to reflect a radiation component of the back-reflected laser beam 5' possibly reaching the first polarizer device 2, or deviate it to a further beam trap, so that it does not propagate further in the second direction R2. To increase the polarization selectivity, a polarization-selective coating 7a is also applied on the rear side of the carrier element 6a of the first polarizer device 2.

Figure 3:
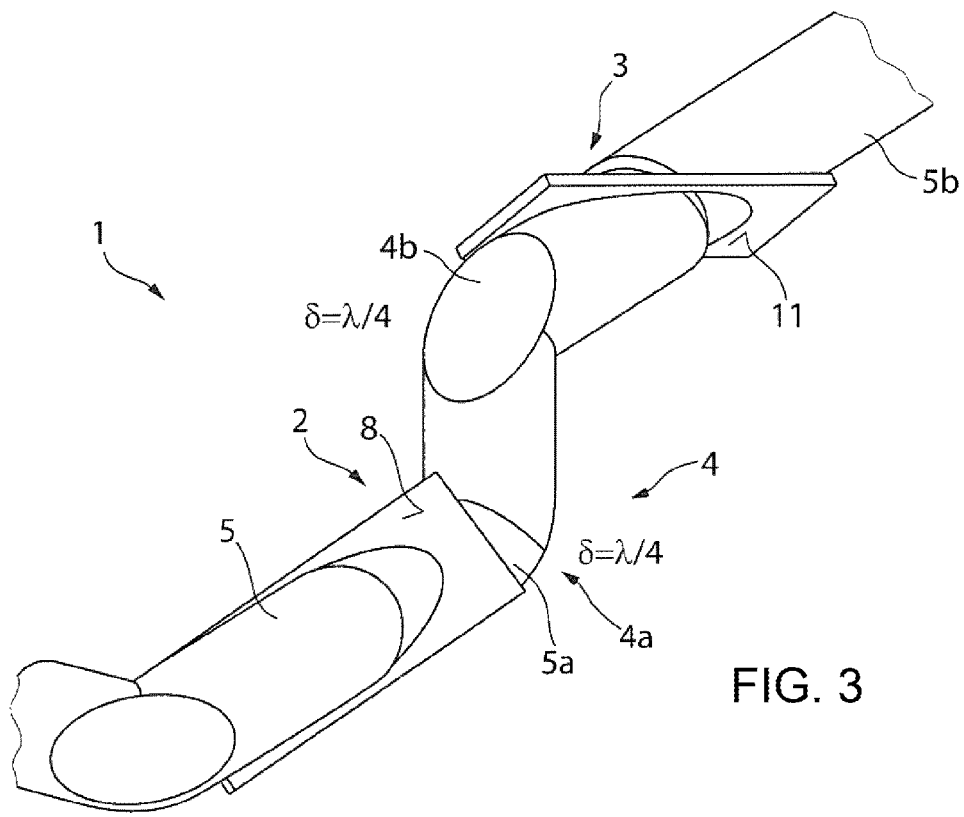
FIG. 3 shows a schematic representation of a polarizer arrangement having a phase shift device in the form of two phase-shifting mirrors.

FIG. 3 shows an example of a polarizer arrangement 1, which differs from the polarizer arrangement 1 shown in FIGS. 1A and 1B and FIGS. 2A and 2B in that, instead of a phase shift device in the form of a retardation plate 4, a phase shift device 4 that includes two phase-shifting mirrors 4a, 4b, which are arranged between the first polarizer device 2 and the second polarizer device 3, is used. The phase-shifting mirrors 4a, 4b respectively induce a path difference of λ/4 (corresponding to a phase shift of 90°). The linearly polarized laser beam 5a transmitted by the first polarizer device 2 becomes circularly polarized at the first phase-shifting mirror 4a and again linearly polarized at the second phase-shifting mirror 4b, so that the polarization direction of the laser beam 5a is rotated overall by a rotation angle β of 90°, as is the case in the polarizer arrangement 1 shown in FIGS. 1A and 1B.

To generate a path difference of λ/4 with the first or second mirror 4a, 4b, the polarization direction of the laser beam 5a can be oriented at an angle of 45° with respect to the plane of incidence onto the respective mirror 4a, 4b, for which reason the first polarizer surface 8 and the second polarizer surface 11 of the polarizer devices 2, 3 are respectively rotated by 45° relative to the respective surface of the phase-shifting mirrors 4a, 4b, each of which causes deviation of the laser beam 5a by 90°.

In the polarizer devices 2, 3 shown in FIGS. 1A and 1B and FIGS. 2A and 2B or FIG. 3, the first and second angles (of incidence) onto the first and second polarizer surfaces 8, 11 are of equal degree, and they respectively correspond to the Brewster angle $α_B$. The angles (of incidence) of the back-reflected laser beam 5' onto the third or fourth polariser surface 8a, 11a are likewise of equal degree and correspond to the Brewster angle $α_B$. This is not however absolutely necessary, i.e., the first and second angles may differ from the Brewster angle $α_B$. It is also favorable, but not absolutely necessary, for the two angles to be of equal degree. The rotation angle β of the phase shift device 4, 4a, 4b may optionally likewise differ (slightly) from 90°, and may optionally lie between 80° and 100°.

Figure 5:
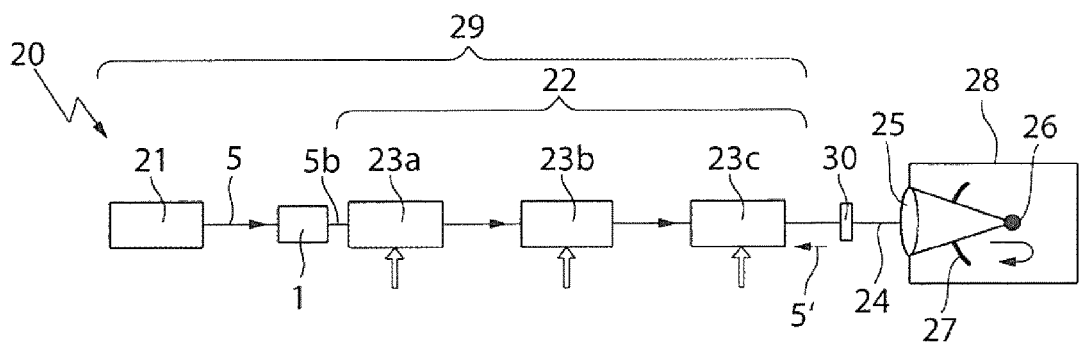
FIG. 5 shows a schematic representation of an EUV radiation generating apparatus having a polarizer arrangement according to FIGS. 1A and 1B, FIGS. 2A and 2B or FIG. 3.

The polarizer arrangement 1 according to FIGS. 1A and 1B, FIGS. 2A and 2B or according to FIG. 3 may be used in different application fields in which a high-power laser beam needs to be polarized. FIG. 5 highly schematically shows an EUV radiation generating apparatus 20 which includes such a polarizer arrangement 1. The EUV radiation generating apparatus 20 includes a beam source 21, an amplifier arrangement 22 having three optical amplifiers or amplifier stages 23a, 23b, 23c, a beam guiding device 24, e.g., a plurality of deflection mirrors, and a focusing device 25, e.g., a lens or a beam-expanding mirror together with an ellipsoid mirror. The focusing device 25 is used to focus the laser beam 5 generated by the beam source 21 and amplified by the amplifier arrangement 22 on a target region in a vacuum chamber 28, in which a target material 26 is placed. During irradiation with the laser beam 5b, the target material 26 is converted into a plasma state and thereby emits EUV radiation, which is focused by a collector mirror 27. In the example shown in FIG. 4, the collector mirror 27 has an opening for the laser beam 5b to pass through. In the example shown, the beam source 21 includes two $CO_2$ lasers to generate a pre-pulse and a main pulse, which are amplified together in the amplifier arrangement 22 and focused onto the target material 26. Together with the amplifier arrangement 22, the beam source 21 forms a driver laser arrangement 29 of the EUV radiation generating apparatus 20.

In the example shown in FIG. 5, the polarizer arrangement 1 is arranged between the beam source 21 and the amplifier arrangement 22 and is used to transmit with the least possible losses the pulsed laser beam 5 generated by the beam source 21, which is typically already linearly polarized, in a first direction from the driver laser arrangement 29 to the target material 26 and to filter or deviate the laser beam 5' reflected back at the target material 26 and propagating in a second direction, so that it can no longer reach the driver laser arrangement 29 or optical elements in the beam path before the polariser arrangement 1.

To filter or deviate the laser beam 5' propagating in the second direction and striking the polarizer arrangement 1 again, its polarization direction is rotated by 90° relative to the laser beam 5b emerging from the polarizer arrangement 1 in the forward direction. To rotate the polarization direction of the laser beam 5b by 90°, a further phase shift device (or phase shifter) 30 is arranged between the polarizer arrangement 1 and the target material 26. The further phase shift device 30 may for example be a phase-shifting mirror, which generates overall a path difference of λ/2 during the passage of the laser beam 5b propagating in the first direction R1 and the back-reflected laser beam 5' propagating in the second direction R2, and thus induces the desired rotation of the polarization direction by 90°. It is to be understood that, to this end, it is also possible to use other phase-shifting or polarization-rotating optical elements, which are arranged between the polarizer arrangement 1 and the target material 26.

It is to be understood that the polarizer arrangement 1 or optionally a further polarizer arrangement may also be arranged at another position in the EUV radiation generating apparatus 20, for example in the beam guiding device 24, to generate a linearly polarized laser beam whose rotationally symmetrical beam profile is essentially preserved when a thermal lens occurs, and optionally to filter the back-reflected laser beam 5'.

What is claimed is:

1. An EUV radiation generator comprising:
    a driver laser source for generating a laser beam;
    a vacuum chamber in which a target material is arranged;
    a beam guider configured to guide the laser beam from the driver laser source in a first direction onto the target material in the vacuum chamber; and
    a polarizer system comprising:
        a first polarizer having a first polarizer surface for linear polarization of the laser beam propagating in the first direction and striking the first polarizer surface at a first angle,
        a phase shifter configured to rotate a polarization direction of the linearly polarized laser beam transmitted at the first polarizer surface by a predetermined rotation angle that is in a range between 80° and 100°, and
        a second polarizer having a second polarizer surface arranged to intercept the linearly polarized laser beam after having passed through the phase shifter, such that the linearly polarized laser beam strikes the second polarizer surface at a second angle and is transmitted by the second polarizer surface, such that an incidence plane of the laser beam striking the second polarizer surface is rotated by the predetermined rotation angle relative to an incidence plane of the laser beam striking the first polarizer surface.

2. The EUV radiation generator of claim 1, further comprising:
    at least one further phase shifter arranged between the polarizer system and the target material,
    wherein the further phase shifter is configured to rotate a polarization direction of a second laser beam reflected at the target material and striking the polarizer system in a second direction opposite to the first direction, such that the polarization direction of the second laser beam is oriented perpendicularly to a polarization direction of the laser beam propagating in the first direction.

3. The EUV radiation generator of claim 1, wherein, when the laser beam propagates through the first polarizer, the first polarizer converts a symmetrical beam profile of the laser beam into an asymmetric beam profile, and
    wherein the second polarizer is configured such that the laser beam transmitted by the second polarizer propagates with a substantially symmetrical beam profile.

* * * * *